United States Patent Office 2,824,826
Patented Feb. 25, 1958

2,824,826

PROTECTING OBJECTS FROM RODENT ATTACK

Constantine Katsaros, Lake Geneva, Wis., and
Andrew A. Baldoni, Woodstock, Ill.

No Drawing. Application June 1, 1954
Serial No. 433,823

6 Claims. (Cl. 167—46)

This invention relates to methods for protecting objects from attack by rodents.

The great economic waste occasioned by the depredations of various rodents, causing injury, destruction or contamination of valuable property and goods, is well known. Accordingly, much effort has been expended in the development of methods and means for the destruction of rodent populations and for preventing or at least ameliorating the damage resulting from their depredations.

The destruction of rodent populations is extremely difficult and in many instances cannot even be undertaken because of economic, practical or legal considerations militating against such an attempt. Some species of rodents, the rat for example, possess a highly developed native intelligence. Although a voracious feeder, the rat is suspicious of foreign odors and tastes and will reject a poisoned bait containing a rapid and direct acting poison unless the presence of the poison is undetectable by taste or smell. In attempting to destroy rats by presentation of a bait containing a rapid and direct acting but tasteless and odorless poison, a rat ingesting a sublethal dose of the poisoned bait can be marked down as a survivor of the attempt at destruction for such a rat will not ingest a second portion of the poisoned bait. Also, some rats are capable of attributing symptoms of poisoning to bait that they are ingesting and will frequently cease consumption of such bait before a fatal dose has been taken. Furthermore, there is no doubt that some healthy rats are capable of attributing symptoms of poisoning in other rats to the bait they have been ingesting and will accordingly avoid such bait.

In addition to difficulties surrounding actual attempts to destroy rodents, in many instances it is not possible to even undertake such an attempt at destruction on the basis of practical, economic or legal considerations. For example, in many instances it may be desired to reforest large areas by seeding them, frequently from the air, with seeds of desired species of trees. Rodents will search out and devour such seed with the result that, at best, a very sparse and uneven stand of young trees is obtained. Attempts have been made to overcome this difficulty by applying a rodenticide to such seed before they are sown. This regimen is generally unsuccessful for one or more of a variety of reasons. In the first place, many rodenticides are phytotoxic, either to the seeds themselves or to young seedlings resulting from the germination thereof. Furthermore, even if the rodenticide is non-phytotoxic it is generally impossible to apply anywhere near a lethal dose thereof to a single seed. Since destruction of the rodent by a rodenticide presented in this manner requires that the rodent consume a quantity of such seeds carrying, in aggregate, a lethal dose of the rodenticide, in the usual case the rodent must consume a large number of seeds to ingest such a lethal dose, again resulting in a sparse and uneven stand of seedlings at best. Also, rodents very frequently remove and discard the outer husk or layer of poisoned seed and then proceed to consume the resulting inner portions of the seed. It it obvious that in such circumstances poisoning of the seed is of no benefit whatsoever. The situation is equally unfavorable with modern rodenticides of the anticoagulant type. Such rodenticides are readily accepted by rodents and are slow acting and accordingly do not exhibit the disadvantages of the older direct acting rodenticides previously outlined herein. Because of the ready acceptance and slow action of such blood anticoagulants they are without practical value in poisoning seeds. Rodents will consume seeds poisoned with such blood anticoagulants without stint and without the development of adverse symptoms for a protracted period, for example, one to two weeks, by which time the damage has been done.

Also, rodents are frequently very destructive to plants, especially young plants, such as seedling trees, young ornamental stock, truck garden crops and the like. Economic considerations usually preclude the distribution of rodenticides throughout plantings subject to such attacks, especially if such plantings are extensive. Direct application of rodenticides to the individual plants is frequently not possible due to the phytotoxicity of many rodenticides and in any event is usually of limited if any benefit due to the fact that the rodent must ingest considerable vegetative tissue to acquire a lethal dose of a rapid and direct acting rodenticide and will consume an enormous amount of vegetative tissue treated with a rodenticide of the anticoagulant type before such material finally puts a period to the depredations. Also, here again, rodents frequently dissect out and discard those portions of vegetative tissue that carry rapid and direct acting rodenticides and then proceed to consume the portions of the plant that remain.

Also, rodents frequently attack packaged goods, such as goods packaged in paper, boxboard, sacks and the like, penetrating the packaging material and bringing about injury, contamination or destruction of the goods contained in such packages. If such packaged goods are stored in warehouses or similar enclosures it is possible to protect them from the depredations of rodents by a continuing rodent eradication program in the storage enclosure. However, such ideal storage conditions are comparatively rare. Frequently it is necessary to store goods for a greater or lesser period on piers and wharves, on loading docks of marshalling yards, on loading docks of railroad sidings and the like and it is not practical to control rodent populations in such situation. Also, packaged goods during movement from the manufacturer to the consumer usually are held for a greater or lesser time in enclosures where adequate rodent control is not practical or is not practiced such as freight cars, trucks, poorly constructed and managed warehouses and the like.

Finally, it must be remembered that the destruction of some species of rodents may be prohibited by law, particularly destruction by means of poison. Prohibitions against the destruction of rabbits and deer are cases in point. (While it is realized that deer are not rodents, deer are very destructive to plants such as young trees, causing injuries very similar to those caused by true rodents so, as far as practical effects are concerned, deer may be considered to be in the same category as rodents.)

Because of the above and many other considerations, there is great need for an effective rodent repellent. A rodent repellent need not be rodenticidal, in fact, rodenticidal properties in an effective rodent repellent could not be utilized and accordingly would be entirely superfluous. Because of the previously mentioned suspicion and dislike of rodents for foreign odors and tastes, it is to be expected that the finding of a whole host of effective rodent repellents would be an easy task. However, this is decidedly not the case. Rats, for example, have the ability to penetrate barriers containing any one of a whole group of compounds that should be highly obnoxious and/or highly toxic to the rat. The rat is able to discard immediately material removed from the barrier during the penetration thereof without ingesting any of it and apparently without tasting any of the obnoxious material that the barrier may contain. As an example of this, rats can penetrate a barrier impregnated with the highly toxic sodium fluoroacetate with impunity. During such a penetration operation the rat will excise and discard barrier material containing sufficient sodium fluoroacetate to kill fifteen rats if ingested. Accordingly, it is evident that the protection of objects from the depredations of rodents may and usually does involve much more than the surrounding of the objects with a barrier containing a rapid and direct acting rodenticide or with a material that the rodent will not ingest.

Although several thousand compounds have been tested as rodent repellents, the number of truly effective rodent repellents that have been found can almost be numbered on the fingers of one hand, and each of these exhibits one or more serious disadvantages, frequently an inordinately high cost.

We have discovered a new group of rodent repellents characterized by a high effectiveness, ready availability and low cost.

It is a principal object of this invention to provide new and useful methods and means for protecting objects from the depredations of rodents.

Additional objects of this invention will become apparent as the description thereof proceeds.

Broadly and briefly, and in accordance with this invention, we have found that 2,4,6-trinitrotoluene, hereinafter referred to at TNT, and complexes thereof are highly effective rodent repellents.

For the better understanding of this invention, the following illustrative but non limiting examples thereof are given:

Example 1

To determine the acceptability of food containing TNT, the following standardized food acceptance test was run:

Sufficient TNT was thoroughly mixed with ground laboratory rat chow to form 2% by weight of the total mixture. An individually caged wild Norway rat was presented with two food cups, one containing 20 g. of the TNT treated chow, the other containing 20 g. of untreated chow. Water was freely available to the rat. Consumption of food from each food cup was determined daily over a four day period with the following results:

| Food | Cumulative Food Consumption, Grams | | | | K |
| --- | --- | --- | --- | --- | --- |
| | First Day | Second Day | Third Day | Fourth Day | |
| Treated | 0.1 | 0.73 | 0.87 | 1.83 | 91.3 |
| Untreated | 20.0 | | | | |

The repellency index, K (Bellack and De Witt, J. Am. Pharm. Assoc., 38, 109, 1949), was calculated from the formula:

$$K = 100 - 1/100w \frac{(8T_1 + 4T_2 + 2T_3 + T_4)}{(U_1 + U_2 + 2U_3 + 4U_4 + 8X)}$$

$T_1 \ldots T_4$ represents consumption in grams of treated food on respective days of the test indicated by the subscripts.

$U_1 \ldots U_4$ represents consumption in grams of untreated food on the respective days of the test indicated by the subscripts.

$w$ is weight of the subject in kilograms.

$X$ is weight of untreated food remaining after the conclusion of the test in grams.

In the absence of repellent activity, all available food would have been consumed at the end of the third day but it will be noted that in this example, while all untreated food was consumed during the first day, comparatively little treated food was consumed over the whole period of the test in spite of the fact that motivation to consume treated food became increasingly great from the second day onward when no untreated food was available. The weighting coefficients in the above formula were selected arbitrarily to emphasize differences in the rates of consumption of treated and untreated foods. While the repellency index K is a more or less empirical figure, on the basis of indices determined for many thousand compounds it may be said that an index of 91.3 is very high and is characteristic of a highly repellent compound. This is also shown by the experimental data given where it is evident that the subject, even though deprived of untreated food for three days, hardly touched the treated food in spite of the fact that rats are, as is well known, voracious feeders.

A high repellency index, determined as above described, does not necessarily mean that the compound in question would be an effective rodent repellent under field conditions. Compounds having a low repellency index obviously will not be effective as rodent repellents under field conditions while compounds having a high index may or may not be effective. As has been mentioned previously rodents, for example, rats, have the ability to penetrate barriers containing repellents without ingesting any of the barrier material and its contents. In the determination of repellency indices as described in the previous example, after all untreated food has been consumed it is necessary for the rodent to ingest the compound under test if additional food is desired. While rodents may refuse to consume an appreciable amount of a food treated with any one of a large number of compounds this does not necessarily mean that rodents will not penetrate barriers impregnated with such compounds since actual ingestion of the barrier and the compound it contains is not involved. Accordingly, the determination of repellency indices is to be considered merely as a rapid and convenient screening procedure by which non-repellent compounds may be eliminated and potential repellents selected for further testing by other procedures.

Example 2

Four parts by weight TNT, two parts by weight Aroclor 1254 and six parts by weight Aroclor 5460 (Aroclors are chlorinated biphenyl and polyphenyls manufactured by Monsanto Chemical Co.) were dissolved in 88 parts by weight acetone. Burlap bags (13 by 8.5 inches) were immersed in the resulting solution and were then wrung out so that the rate of application of TNT was approximately 9 mg. per square inch of bag surface. Seven such bags were prepared and, when dry, were partially filled with two pounds mixed grain and ground rat food. Seven untreated bags were also filled with the same amount of the same animal feed mixture. The fourteen bags were exposed in a Latin square to a colony of eighteen wild Norway rats in an experimental rat pit. The first untreated bag was penetrated on the first day of the test and the seventh untreated bag was penetrated on the twentieth day of the test; the average time for penetration of untreated bags being 10.9 days. The first treated bag to be penetrated was penetrated on the twenty-sixth day, the seventh treated bag was penetrated on the forty ninth day; average time for penetration of treated bags, 39.4 days. No food, other than that contained in the bags, was supplied during this test.

Example 3

The TNT solution of Example 2 was applied to the outside surfaces of fiberboard boxes (8 x 4 x 8 inches), the rate of application of TNT being approximately 10 mg. per square inch. One half pound of ground rat food was contained in each box, and untreated control boxes each of which also contained one half pound of the ground rat food were also prepared. Three treated boxes and three untreated boxes were exposed simultaneously and together to a colony of about fifty wild Norway rats in an exposure enclosure. Food was supplied to these rats at intervals throughout the test. This food was supplied in an amount and at the intervals necessary to prevent starvation of the rats and to maintain a high level of motivation on the part of the rats to seek out and obtain additional food. The average time required for penetration of the untreated boxes by the rats was five days (all untreated boxes were penetrated on the fifth day). The average time required for penetration of the treated boxes was 7.3 days (the first treated box penetrated was penetrated on the fifth day, the treated box last to be penetrated was penetrated the tenth day).

Example 4

The test procedure of Example 3 was repeated some 2.5 months after the test of Example 3 with a new group of treated and untreated boxes. In this repeat test the first untreated box was penetrated on the first day and all untreated boxes had been penetrated at the end of the second day; average time for penetration, 1.7 days. All treated boxes were penetrated on the eighth day; average time, eight days.

Example 5

The composition of Example 2 was applied to the trunks of eleven young trees located in an enclosure having a high rabbit population. The test was begun early in the winter and three months after the initiation thereof only two of the eleven treated trees had been subjected to rabbit attack. Eleven young untreated control trees were also in the enclosure containing the treated trees. All eleven control trees had been completely girdled three days after initiation of the test.

Example 6

A water paste of disintegrated starch containing TNT was applied to the outside surfaces of the fiberboard test boxes at a rate of approximately 10 mg. TNT and 100 mg. starch per square inch. The boxes were each provided with one half pound of ground rat food. Three such boxes and three untreated boxes, each of which also contained one half pound ground rat food, were exposed simultaneously and together to a colony of about fifty wild Norway rats as described in Example 3. The TNT treated boxes of Example 3 and the TNT treated boxes of the present example and the untreated controls were actually exposed together and simultaneously in a single test but for greater clarity in exposition the results of the two TNT treatments are presented in separate examples. As set forth in Example 3, the three untreated boxes were penetrated on the fifth day. The first of the TNT-starch paste treated boxes of this example to be penetrated was penetrated on the seventh day, the last TNT-starch paste treated box penetrated was penetrated on the fourteenth day; average time for penetration, 10.7 days.

Example 7

Three fiberboard test moxes were treated with TNT-starch paste and provided with ground rat food all as described in Example 6. These boxes were exposed simultaneously and together with the treated boxes and untreated controls of Example 4. As set forth in Example 4, the average penetration time for the untreated controls was 1.7 days. All TNT-starch paste treated boxes were penetrated on the tenth day, the average penetration time being then ten days.

A consideration of the results of Examples 3, 4, 6 and 7 shows that at a TNT application rate of 10 mg. per square inch, the TNT-starch formulation is more effective than the TNT-Aroclor formulation. However, other results, presentation of which would be largely repetitious, show that at higher rates of application of TNT the reverse is true, the TNT-Aroclor formulation being more effective than the TNT-starch formulation.

The rate of application of the repellents of this invention may be varied over wide limits. A very distinct repellent effect is observed when the application rate of the repellent is as low as 1-2 mg. per square inch. Obviously, the upper limit of the rate of application is largely determined by economic and similar considerations but in general it may be said that no appreciable enhancement in repellent effect is noticeable on exceeding a repellent application rate around 50 mg. per square inch.

A number of factors must be considered in selecting the best method for application of the rodent repellents of this invention, these factors including the character of the goods to be protected and the species of rodent to be repelled.

In general, impregnation of paper stock fibers with the repellent is not too satisfactory. Addition of a solution or dispersion of the repellent to the beaters is not only wasteful but results in the production of papers of inferior grade and also in papers that exhibit little if any repellency. Apparently, paper stock fibers either do not absorb or adsorb the repellent or adsorb it in such a manner that the repellent characteristics thereof are largely lost.

A repellent of this invention may be applied to a surface by first coating the surface with an adhesive and then dusting the surface with the selected repellent in finely divided form. This method of application is, in general, also not too satisfactory. Practically all adhesives investigated mask, to a greater or lesser extent, the repellent properties of the compound applied.

The most generally useful method of application involves applying a solution or dispersion of the repellent to the surface to be protected or to a barrier material surrounding the material or object or objects to be protected. The solution or dispersion may contain more or less of a suitable binder, more or less of a dispersed solid, and any other material or materials that may be desirable or necessary.

The composition of Example 2 is a solution of a repellent of this invention, said solution also containing Aroclors as binder. The composition of Example 6 is a dispersion of a repellent of this invention in water, said dispersion also containing a starch product which serves as a binder.

If desired, concentrated solutions or dispersions of the repellents of this invention may be prepared (also containing, if desired, binders, dispersed solids, and the like) and these may be appropriately diluted prior to use to form a solution or dispersion of the required concentration for direct application to surfaces.

A concentrated emulsifiable formulation may be prepared as follows (parts are by weight):

TNT _____ 25
Tween 40 * _____ 4
Aroclors ** _____ 25
Xylene _____ 46

\* Polyethylene glycol-sorbitol fatty acid ester condensation product (Atlas Powder Co.).
\*\* Mixture of Aroclor 1254 and Aroclor 5460 in a 1:3 weight ratio.

The above solution may be stirred into water to produce a binder containing dispersion of the repellent of any desired concentration.

Another emulsifiable binder containing concentrate may be prepared as follows (parts are by weight):

| | |
|---|---:|
| TNT | 14.0 |
| Cyclohexanone | 18.7 |
| Xylene | 37.3 |
| Aroclor 5460 | 21.0 |
| Aroclor 1254 | 7.0 |
| Ni-W * | 2.0 |

* A dispersant manufactured by Oronite Chemical Co.

A concentrated dispersion of the repellents of this invention may be formulated as follows (parts are by weight):

| | |
|---|---:|
| TNT | 20.0 |
| Rhoplex AC-33 * | 20.0 |
| Carboxy methyl cellulose (high viscosity) | 0.5 |
| Tamol 731 ** | 0.5 |
| Water | 59.0 |

* An acrylic resin emulsion, 46% solids content. Rohm and Haas Company.
** Dispersion agent for aqueous systems. Rohm and Haas Company.

The above concentrated dispersion may be stirred into additional water to produce a dispersion containing any desired concentration of the repellent. Other binders may be employed in formulations of this kind, such as a synthetic rubber latex, for example, 762W, a butadiene-styrene latex manufactured by the Dow Chemical Company.

Also, the repellents of this invention may be incorporated into resinous materials such as polyvinyl chloride and the resulting composition sheeted out into films containing from 1-2 to about 50 mg. per square inch of the repellent. Such sheets may be used as loose or as sealed wraps for materials and objects to protect them from the depredations of rodents.

Formulations containing the repellents of this invention may be applied by any suitable method or means. As mentioned immediately above, sheets or films containing the repellents of this invention may be used as loose or sealed wraps. Or, if desired, these sheets or films may be laminated with paper, paper board or the like to produce a barrier surface.

Solutions or dispersions of the repellents of this invention may be applied by any appropriate and convenient method or means. Thus, as specifically set forth in Example 2, a solution of a repellent of this invention was applied to a textile material by immersing the textile in the solution; in Examples 3 and 4 this solution was applied to a fiberboard surface and in Example 5 to the trunks of trees (by brushing). In Examples 6 and 7 a dispersion of the repellent is applied to fiberboard (by brushing) and the same formulation can be applied to the trunks of trees by brushing or spraying and can be used to impregnate textile materials.

Solutions or dispersions of the repellents of this invention may be applied to surfaces such as paper and fiberboard by conventional roller coating procedures and the coated products may then be fabricated into bags, boxes and similar containers. Also, solutions or dispersions of the repellents of this invention may be applied as a spray, this method of application being especially convenient when plants such as young trees, ornamentals and truck crops are to be protected from the depredations of rodents.

It is a well known fact that TNT can be detonated under the proper conditions. However, formulations such as have been described herein cannot be detonated and due to the extremely low rate of application required to secure a repellent effect, surfaces carrying a repellent amount of TNT are not dangerous. Nevertheless, various legal restrictions, due to loose and/or too-inclusive wording thereof, may hinder or, in some cases, even prevent the free and unrestricted transportation, storage and use of rodent repellent formulations containing TNT. In addition to any such legal restrictions, a psychological barrier must be considered. TNT is well known to the general public as a high explosive and there might be considerable reluctance on the part of certain segments of the public to become involved with the transportation, storage or use of a rodent repellent formulation containing TNT even though the formulation was entirely free from any possibility of detonation. Accordingly, after discovery of the high rodent repelling effect of TNT itself, attempts were made to develop derivatives of TNT which not only retained the high rodent repellency of TNT but also were not susceptible to detonation. As the result of these collateral investigations it has been found that complexes of TNT with such materials as hydrocarbons, amines, phenolic compounds, anisidines and the like are entirely non-explosive but at the same time are effective rodent repellents. Representative TNT complexes are shown in the following tabulation:

| Complex | M. P., °C. | Form |
|---|---|---|
| TNT-naphthalene | 98 | Red crystals. |
| TNT-acenaphthene | 109-110 | Yellow needles. |
| TNT-aniline | 83-84 | Light red needles. |
| TNT-alpha napthylamine | 141 | Dark red needles. |
| TNT-alpha naphthol | 126 | Orange crystals. |
| TNT-beta naphthol | 106 | Yellow needles. |

These complexes are soluble in ketones and chlorinated hydrocarbons and are slightly soluble in aromatic hydrocarbons, ethers and alcohols. Also, these complexes can be readily dispersed in non-solvents therefor and can be readily incorporated into film forming plastics. The TNT complexes may be formulated and applied as previously described with respect to TNT itself, such application resulting in a similar rodent repelling effect.

The following illustrative but non-limiting examples demonstrate the rodent repellency of a typical TNT-complex:

*Example 8*

A dispersion of the TNT-beta naphthol complex was prepared in a 1% aqueous suspension of Flokote, Flokote being the designation applied to a soluble starch product of the National Starch Company. Small bags (4 x 8 inch) were dipped in the resulting formulation, the rate of application of the complex being approximately 6 mg. per square inch. After impregnation and drying, the bags were filled with rodent feed. A number of untreated bags were also filled with rodent feed.

In each of seventeen cages there was placed one feed containing treated bag, one feed containing untreated bag and one house mouse. The resulting assemblage of cages with their contents was allowed to stand over night. Next morning, all of the untreated control bags were found to be penetrated while none of the treated bags had been harmed.

*Example 9*

The procedure of Example 8 was followed except that each cage was provided with one feed containing treated bag, one feed containing untreated bag and one wild Norway rat. Next morning all seventeen untreated control bags had been penetrated while but ten of the treated bags had been penetrated.

Be it remembered, that while this invention has been described in connection with specific details and examples thereof, these are illustrative only and are not to be considered limitations on the spirit or scope of said invention except in so far as these may be incorporated in the accompanying claims.

We claim:

1. A method for protecting an object from rodent attack, comprising encompassing the object with a rodent repellent barrier comprising a material selected from the group consisting of 2,4,6-trinitrotoluene, 2,4,6-trinitrotoluene-beta naphthol complex, 2,4,6-trinitrotoluene-o-anisidine complex, 2,4,6-trinitrotoluene-alpha naphylamine complex and 2,4,6-trinitrotoluene-acenaphthene complex, and a carrier therefor.

2. A method for protecting an object from rodent attack, comprising encompassing said object with a rodent repellent barrier comprising 2,4,6-trinitrotoluene and a carrier therefor.

3. A method for protecting an object from rodent attack, comprising encompassing said object with a rodent repellent barrier comprising 2,4,6-trinitrotoluene-beta naphthol complex and a carrier therefor.

4. A method for protecting an object from rodent attack, comprising encompassing said object with a rodent repellent barrier comprising 2,4,6-trinitrotoluene-o-anisidine complex and a carrier therefor.

5. A method for protecting an object from rodent attack, comprising encompassing said object with a rodent repellent barrier comprising 2,4,6-trinitrotoluene-alpha naphthylamine complex and a carrier therefor.

6. A method for protecting an object from rodent attack, comprising encompassing said object with a rodent repellent barrier comprising 2,4,6-trinitrotoluene-acenaphthene complex and a carrier therefor.

References Cited in the file of this patent

Journal of American Pharm. Ass'n for November 1953, pp. 695–697.

Bellack et al.: Relationship Between Chemical Structure and Rat Repellency (May 8, 1953), page 125.